United States Patent
Greenwald et al.

(10) Patent No.: US 7,809,736 B2
(45) Date of Patent: Oct. 5, 2010

(54) IMPORTANCE RANKING FOR A HIERARCHICAL COLLECTION OF OBJECTS

(75) Inventors: Amy Greenwald, Providence, RI (US); John R. Wicks, Kingston, RI (US)

(73) Assignee: Brown University, Providence, RI (US)

(*) Notice: Subject to any disclaimer, the term of this patent is extended or adjusted under 35 U.S.C. 154(b) by 588 days.

(21) Appl. No.: 11/919,262

(22) PCT Filed: May 2, 2006

(86) PCT No.: PCT/US2006/016938
§ 371 (c)(1),
(2), (4) Date: Oct. 25, 2007

(87) PCT Pub. No.: WO2006/124287
PCT Pub. Date: Nov. 23, 2006

(65) Prior Publication Data
US 2009/0319565 A1    Dec. 24, 2009

Related U.S. Application Data

(60) Provisional application No. 60/676,818, filed on May 2, 2005.

(51) Int. Cl.
*G06F 17/30* (2006.01)
(52) U.S. Cl. .................................................... 707/755

(58) Field of Classification Search .................. 707/723, 707/736, 748, 754, 755, 795, 797, 803
See application file for complete search history.

(56) References Cited

U.S. PATENT DOCUMENTS

| | | | |
|---|---|---|---|
| 5,379,422 A * | 1/1995 | Antoshenkov | 1/1 |
| 5,864,867 A * | 1/1999 | Krusche et al. | 1/1 |
| 6,233,575 B1 | 5/2001 | Agrawal et al. | |
| 6,757,587 B1 * | 6/2004 | English et al. | 700/245 |
| 7,251,654 B2 * | 7/2007 | Eiron et al. | 707/723 |
| 2002/0174147 A1 * | 11/2002 | Wang et al. | 707/513 |
| 2004/0019598 A1 | 1/2004 | Huang et al. | |
| 2004/0088118 A1 * | 5/2004 | Jensen et al. | 702/30 |
| 2006/0056363 A1 * | 3/2006 | Ratiu et al. | 370/338 |

* cited by examiner

*Primary Examiner*—Cam-Linh Nguyen
(74) *Attorney, Agent, or Firm*—Weingarten, Schurgin, Gagnebin & Lebovici LLP

(57) ABSTRACT

A system and method of obtaining an importance ranking for a hierarchical collection of objects. The hierarchical collection of objects is represented as a tree containing a plurality of nodes, and each node to be ranked is represented as a respective leaf node of the tree. To obtain the ranking of the respective leaf nodes, the system and method locally ranks nodes contained in one or more sub-trees of the tree, in which each sub-tree has a depth equal to one. Next, the local rankings are effectively propagated up the tree, and the local rankings are aggregated at each level of the hierarchy, until a final importance ranking for the leaf nodes is obtained.

20 Claims, 8 Drawing Sheets

IMPORTANCE RANKING FOR A HIERARCHICAL COLLECTION OF OBJECTS

CROSS REFERENCE TO RELATED APPLICATIONS

This application claims benefit of U.S. Provisional Patent Application No. 60/676,818 filed May 2, 2005 entitled QUICKRANK, AN IMPROVED METHOD FOR IMPORTANCE RANKING.

STATEMENT REGARDING FEDERALLY SPONSORED RESEARCH OR DEVELOPMENT

This invention was made with U.S. government support under Grant Nos. 0133689 and 0534586 awarded by the National Science Foundation (NSF). The U.S. government has certain rights in the invention.

BACKGROUND OF THE INVENTION

The present invention relates generally to computerized information retrieval systems and methods, and more specifically to a system and method of obtaining an importance ranking for a hierarchical collection of objects, such as documents or pages in a linked database such as the world wide web.

In recent years, users of host computers connected to the Internet have increasingly employed application programs such as web browsers and search engines to search for information contained in documents or "pages" on the world wide web (WWW or "web"). In a typical search for one or more "web pages" of interest, a user of a host computer ("host") composes a search query containing one or more specified keywords, and submits the query to a search engine, e.g., the Google™, AltaVista™, or Excite™ search engine, via a web browser, e.g., the Microsoft Internet Explore™ or Netscape Navigator™ web browser. In response to the user's query, the search engine typically searches a "snapshot" (i.e., a cached version) of the web for pages containing the specified keywords. Such a snapshot of the web generally stores a list of web pages that is indexed based upon certain words and/or phrases that may be found in the contents of the pages. The indexed list of web pages may be generated using one or more web crawler or "spider" programs that operate to fetch pages from the web. Because the world wide web may be regarded as a hyperlinked database, each web page fetched by a spider program may contain one or more hyperlinks to one or more other web pages. A spider program can employ these hyperlinks to fetch additional web pages. The search engine searches the indexed list of web pages, identifies as many web pages as possible containing the keywords specified in the query, and generates a result set including a list of the identified pages. Because the result set generated by the search engine may list hundreds if not thousands or millions of web pages, the search engine generally ranks the web pages based upon their relevance to the user's query and their "importance" relative to one another, thereby assuring that relevant and important pages appear at or near the top of the list.

One known technique for obtaining an importance ranking of web pages is the PageRank™ technique, which employs hyperlinks from one web page to another as indicators of a web page's importance. According to the PageRank™ technique, a hyperlink from a first web page to a second web page effectively operates as a "vote" by the first page for the second page. Such a hyperlink may indicate that the author of the first web page thinks highly of the content of the second web page. As the number of votes for the second web page increases, the importance of that page increases. The PageRank™ technique not only considers the number of votes cast for a particular web page, but also takes into account the importance of the web pages casting the votes. For example, the PageRank™ technique may give more weight to votes cast by important web pages than to votes cast by pages that are deemed to be either unimportant or of lesser importance. The PageRank™ technique is typically employed in conjunction with one or more keyword matching techniques to identify web pages that are both important and relevant to a user's search query.

One drawback of the PageRank™ technique is that it generally fails to consider any structure inherent in the world wide web and how the web pages to be ranked fall within that structure when generating an importance ranking. For example, the web may be regarded as having a hierarchical structure based upon the domains and sub-domains of the web, the categories and sub-categories of the subject matter contained in the web pages, or based upon any other suitable construct for hierarchically classifying documents or pages on the web. Although the PageRank™ technique may take into account the number of votes cast by web pages and the importance of the pages casting the votes, the PageRank™ technique does not generally consider the importance of the web pages relative to their vicinity to one another within any structure of the web. As a result, search engines that employ the PageRank™ technique may be incapable of retrieving web pages that are the most important and relevant to a user's query.

It would therefore be desirable to have a system and method of obtaining an importance ranking for objects in a linked database that takes into account any structure of the database.

BRIEF SUMMARY OF THE INVENTION

In accordance with the present invention, a system and method is provided to obtain an importance ranking for a hierarchical collection of objects. The presently disclosed importance ranking technique represents the hierarchical collection of objects as a tree containing a plurality of nodes, in which each object to be ranked is represented by a respective leaf node of the tree. To obtain the importance ranking of the respective objects, the disclosed technique locally ranks the objects represented by the leaf nodes within each subtree of depth one. Next, the local rankings are effectively propagated up the hierarchy, while being aggregated at each level of the hierarchy, until a final importance ranking for the objects is obtained.

In one embodiment, the presently disclosed system and method for obtaining an importance ranking may be employed to rank documents or "pages" in a linked database such as the world wide web (WWW or "web"), in which the hierarchy may include domains or categories. Such a system may include at least one host computer ("host") and a plurality of server computers ("servers") communicably connected to at least one communications network such as the Internet. Each of the plurality of servers is a part of the web. The host is configured to execute a web browser application program, and at least one of the plurality of servers is configured to execute a search engine application program. For example, the disclosed importance ranking technique may be implemented as a part of the search engine executing on one of the servers, or as a part of the web browser executing on the host.

When searching for one or more web pages of interest, a user of the host computer composes a search query containing one or more specified keywords, and submits the query over the Internet to the search engine executing on the respective server. Next, in response to the user's query, the search engine may search a list of web pages indexed according to certain words and/or phrases in the contents of the pages, identify as many web pages as possible containing the keywords specified in the query, and generate a result set including a list of the identified pages. Each web page listed in the result set may contain one or more hyperlinks ("links") to one or more other web pages. In addition, the web pages in the result set may be represented as a hierarchical collection of pages based upon the domain and/or sub-domains associated with each page, the category and/or sub-categories of subject matter contained in the pages, or any other suitable construct for hierarchically classifying documents or pages on the web.

In one mode of operation, a set of web pages, e.g., either all of the web pages on the web or a subset of pages such as those listed in the result set, are ranked according to their importance as follows. First, the web pages are represented as a plurality of nodes in a directed graph, in which each of the pages corresponds to a respective one of the plurality of nodes, and the hyperlinks from one web page to another web page are represented as directed edges interconnecting selected pairs of the nodes. Because each of the web pages in the result set may contain one or more hyperlinks to one or more of the other pages in the set, each of the edges included in the directed graph is "weighted" by the number of hyperlinks from one web page to another. For example, each of the directed edges may be weighted by the number of links emanating from a particular web page (the "outlinks"), and/or the number of links pointing to that particular web page (the "inlinks").

Next, the web pages represented as the plurality of nodes in the directed graph are hierarchically classified, thereby allowing the nodes in the directed graph to be represented as a plurality of leaf nodes in a tree. For example, each level of the hierarchy of the tree may represent a respective domain or sub-domain of the web, a respective category or sub-category of subject matter, or any other suitable construct for hierarchically classifying the pages. Each of the leaf nodes representing a respective web page has an associated ranking, which is expressed as a probability distribution. In addition, each of the leaf nodes has an associated vector of "non-local" links, each element of which contains information that depends upon the weightings of the respective directed edges associated with that node. For example, each element of the vector of non-local links may correspond to all (or a subset of all) of the outlinks from that node to one of the other nodes, and/or all (or a subset of all) of the inlinks from one of the other nodes to that node. Next, the rankings and the vectors of non-local links associated with the leaf nodes of the tree are initialized. Specifically, each ranking associated with a respective leaf node is initialized as the probability distribution [1]. In addition, each of the vectors of non-local links associated with a respective leaf node is initialized based upon the weightings of the edges connected to that node in the directed graph.

To obtain the importance ranking of the web pages represented by the plurality of leaf nodes of the tree, a first subtree of the tree is selected having a depth equal to one. In other words, the selected subtree has a single parent or root node "n", and one or more child nodes "j" connected directly to the root node n. Next, for each leaf node j of the selected subtree, the vector of non-local links associated with that leaf node is partitioned into a vector of "local" links and a vector of non-local links. The vector of local links associated with the respective leaf node includes all of the outlinks from that leaf node to one or more of the other leaf nodes within the selected subtree, and/or all of the inlinks from one or more of the other leaf nodes within the selected subtree to that leaf node. In addition, the vector of non-local links associated with the respective leaf node includes all of the outlinks from that leaf node to one or more of the other leaf nodes outside of the selected subtree, and/or all of the inlinks from one or more of the other leaf nodes outside of the selected subtree to that leaf node.

Next, two matrices are constructed using the vectors of local links and the vectors of non-local links associated with the respective leaf nodes j of the selected subtree. Specifically, a first matrix is constructed by concatenating the vectors of local links, and a second matrix is constructed by concatenating the vectors of non-local links. For example, if each of the vectors of local links is a column vector, then each column of the first matrix corresponds to a respective one of the vectors of local links. Similarly, if each of the vectors of non-local links is a column vector, then each column of the second matrix corresponds to a respective one of the vectors of non-local links. Alternatively, if each of the vectors of local links is a row vector, then each row of the first matrix may correspond to a respective one of the vectors of local links. Similarly, if each of the vectors of non-local links is a row vector, then each row of the second matrix may correspond to a respective one of the vectors of non-local links. Next, a non-hierarchical base ranking technique (e.g., the PageRank™ technique) is applied to the matrix of local links to obtain a probability distribution that represents a local ranking of the web pages represented by the leaf nodes j of the selected subtree. The matrix of non-local links is then multiplied by the local ranking to obtain a single vector of non-local links. Next, each of the rankings associated with the leaf nodes j is scaled by a corresponding element (i.e., the $j^{th}$ element) of the local ranking, and these scaled rankings of the leaf nodes j are concatenated into a single ranking. The leaf nodes j of the selected subtree are then deleted from the tree, turning the root node n into a leaf node.

Next, the steps of (1) selecting a next subtree of depth one within the tree of nodes, (2) partitioning the vectors of non-local links associated with the leaf nodes of the selected subtree into vectors of local links and vectors of non-local links, (3) constructing first and second matrices using the vectors of local links and the vectors of non-local links associated with the leaf nodes, (4) applying the base ranking technique to the matrix of local links to obtain the local ranking within the selected subtree, (5) multiplying the matrix of non-local links by the local ranking to obtain a single vector of non-local links relative to the selected subtree, (6) scaling each ranking of the leaf nodes by its corresponding element of a vector of local ranks generated from the local ranking to obtain a single ranking for the selected subtree, and (7) deleting the leaf nodes of the selected subtree from the tree, are repeated until the depth of the resulting tree is equal to zero, i.e., the tree of nodes has collapsed to a single node. At that point, the single ranking for the tree corresponds to the final importance ranking of the web pages.

By representing web pages contained in a result set of a search query as a plurality of leaf nodes in a tree, locally ranking the web pages represented by the leaf nodes within each subtree of depth one, and propagating these local rankings up the tree while aggregating the rankings at each level of the hierarchy, a single importance ranking for the web pages can be obtained. Such a method of importance ranking reduces computation time when compared with other non-hierarchical ranking schemes because certain process steps associated with the respective subtrees of the tree can be performed in parallel. Memory requirements can also be reduced because only the matrices of link data associated with each respective subtree are stored in memory. In addition, because the disclosed importance ranking system and method is based upon a partitioning of a tree of nodes into a plurality of subtrees, computations performed using the disclosed technique are easier to update when changes are made that affect only small neighborhoods of a linked hierarchical database.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 2b is a diagram illustrating a tree including a plurality of leaf nodes corresponding to the pages of FIG. 2a;

DETAILED DESCRIPTION OF THE INVENTION

The entire disclosure of U.S. Provisional Patent Application No. 60/676,818 filed May 2, 2005 entitled QUICK-RANK, AN IMPROVED METHOD FOR IMPORTANCE RANKING is incorporated herein by reference.

A system and method is disclosed for obtaining an importance ranking for a hierarchical collection of objects. The disclosed system and method represents the hierarchical collection of objects as a tree containing a plurality of nodes, in which each object to be ranked is represented by a respective leaf node of the tree. To obtain the importance ranking of the respective objects, the disclosed system and method locally ranks the objects represented by the leaf nodes within subtrees of depth one. Next, the local rankings are effectively propagated up the hierarchy, while being aggregated at each level of the hierarchy, until a final importance ranking for the objects is obtained.

Figure 1:
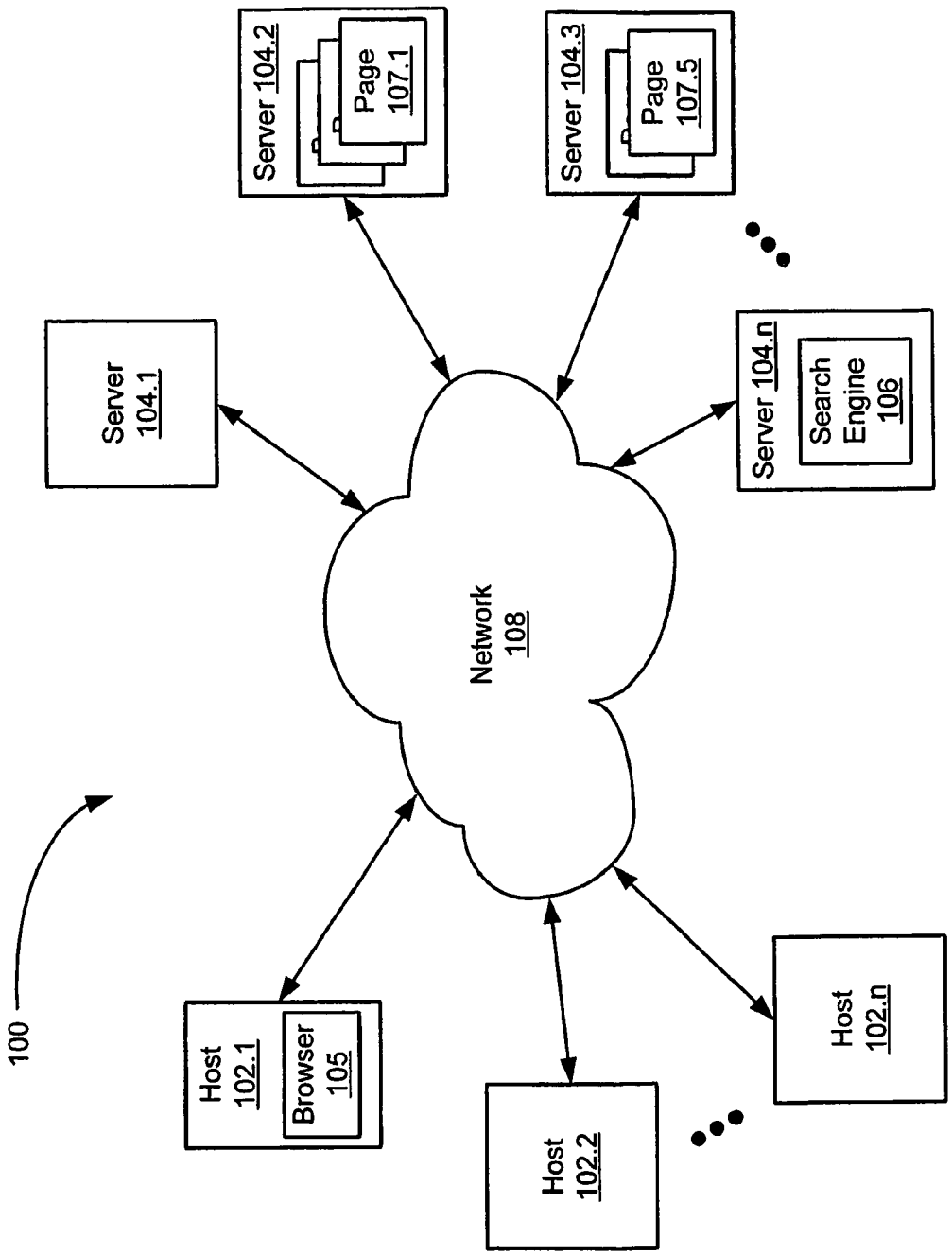
FIG. 1 is a block diagram of an illustrative environment in which a system and method of obtaining an importance ranking for a hierarchical collection of documents or pages may be employed, in accordance with the present invention.

FIG. 1 depicts an exemplary environment 100 in which the presently disclosed system and method of obtaining importance rankings may be employed. As shown in FIG. 1, the environment 100 includes a plurality of host computers ("hosts") 102.1-102.$n$, a plurality of server computers ("servers") 104.1-104.$n$, and at least one communications network 108. The plurality of hosts 102.1-102.$n$ and the plurality of servers 104.1-104.$n$ are communicably connected to the communications network 108, which may comprise a public communications network such as the Internet, a private communications network, a local area network (LAN), a wide area network (WAN), a wireless communications network, or any other suitable type of network. Further, each of the hosts 102.1-102.$n$ and each of the servers 104.1-104.$n$ may be embodied as a single computer system or as separate subsystems, each including one or more processors, program code memory, an operating system, and application software.

In the presently disclosed embodiment, the plurality of servers 104.1-104.$n$ is a part of the world wide web (WWW or "web"). As known in the art, each server constituting a part of the web is configured to maintain documents or "web pages" formatted in a markup language such as the hypertext markup language (HTML), which supports hyperlinks ("links") to other documents or web pages. As shown in FIG. 1, a plurality of web pages 107.1-107.3 is maintained by the server 104.2, and a plurality of web pages 107.4-107.5 is maintained by the server 104.3. The environment 100 therefore represents an exemplary environment for a database of web pages that may be hyperlinked to one another.

As further shown in FIG. 1, at least one of the hosts 102.1-102.$n$, e.g., the host 102.1, is configured to execute a web browser application program 105, and at least one of the plurality of servers 104.1-104.$n$, e.g., the server 104.$n$, is configured to execute a search engine application program 106. For example, the web browser 105 may be implemented as the Microsoft Internet Explorer™ web browser, the Netscape Navigator™ web browser, or any other suitable web browser. Further, the search engine 106 may be implemented as the Google™ search engine, the AltaVista™ search engine, the Excite™ search engine, or any other suitable search engine. As known in the art, a user of the host 102.1 may implement a search for one or more web pages of interest by composing a search query containing one or more specified keywords, and submitting the query to the search engine 106 over the communications network 108 via the web browser 105. In response to the user's query, the search engine 106 operates to search a "snapshot" (i.e., a cached version) of the web or some subset thereof to identify web pages containing the specified keywords, and generates a result set including a list of the identified pages.

It is noted that the result set returned by the search engine 106 may include the entire web or some subset thereof, e.g., that part of the web corresponding to a specified sub-domain. The result set may therefore list hundreds if not thousands or millions of web pages. For purposes of illustration, it is assumed that the search engine 106 searches a snapshot of the web including the limited number of web pages 107.1-107.5. The presently disclosed importance ranking technique may be employed to rank all web pages, or those pages listed in the result set to assure that the most important pages appear at or near the top of the list. For example, the presently disclosed importance ranking technique may be implemented as a part of the web browser 105 executing on the host 102.1, as a part of the search engine 106 executing on the server 104.$n$, as a separate application program executing on the host 102.1 or on the server 104.$n$, or as any other suitable program executing on any other suitable computer connected to the network 108.

As described above, each of the plurality of servers 104.1-104.$n$ included in the environment 100 constitutes a part of the world wide web. For example, the web pages 107.1-107.5 may be represented as a hierarchical collection of pages based upon the domain and/or sub-domains associated with each page. Further, each of the plurality of servers 104.1-104.$n$ may be physically or logically located within at least one of the domains and/or sub-domains of the web. Moreover, each domain or sub-domain of the web may correspond to a particular organization or entity such as a university or a department thereof, a corporation or a division thereof, or any other suitable organization or entity. It is noted, however, that the web pages 107.1-107.5 may alternatively be represented as a hierarchical collection of pages based upon any other suitable construct for hierarchically classifying the pages such as the category and/or categories of subject matter contained in the pages.

Figure 2A:
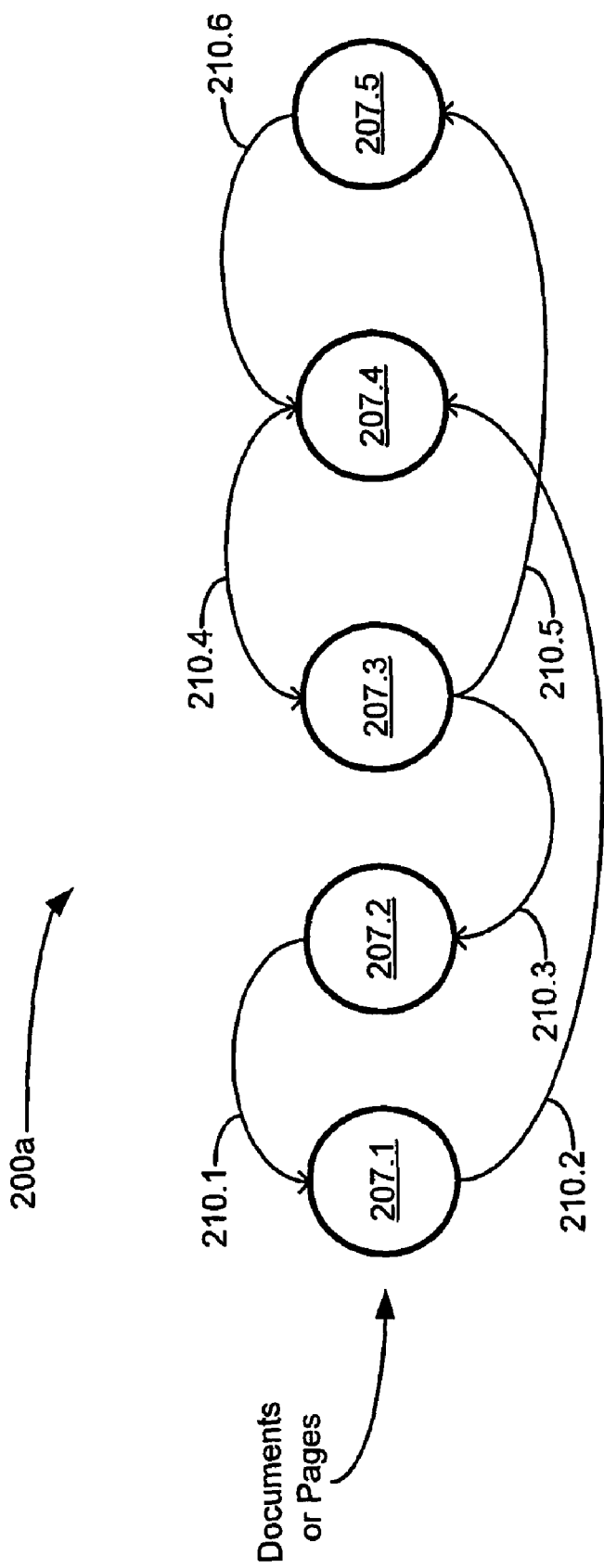
FIG. 2a is a directed graph including a plurality of nodes representing hyperlinked pages in the environment of FIG. 1.

For example, an exemplary hierarchy may be imposed upon the structure of the world wide web as follows. First, a directed graph 200a (see FIG. 2a) including a plurality of nodes 207.1-207.5 representing respective documents or web pages, and a plurality of hyperlinks ("links") 210.1-210.6 interconnecting the respective pages 207.1-207.5, may be constructed. As shown in FIG. 2a, the links 210.1-210.6 correspond to directed edges interconnecting selected pairs of the web pages 207.1-207.5. For example, each of the web pages 207.1-207.5 may be an HTML-formatted document, which may include one or more hyperlinks to one or more other documents or web pages. For example, the web page 207.1 may include the hyperlink 210.2 to the web page 207.4, the web page 207.2 may include the hyperlink 210.1 to the web page 207.1, the web page 207.3 may include the hyperlinks 210.3 and 210.5 to the web pages 207.2 and 207.5, respectively, the web page 207.4 may include the hyperlink 210.4 to the web page 207.3, and the web page 207.5 may include the hyperlink 210.6 to the web page 207.4.

Figure 2B:
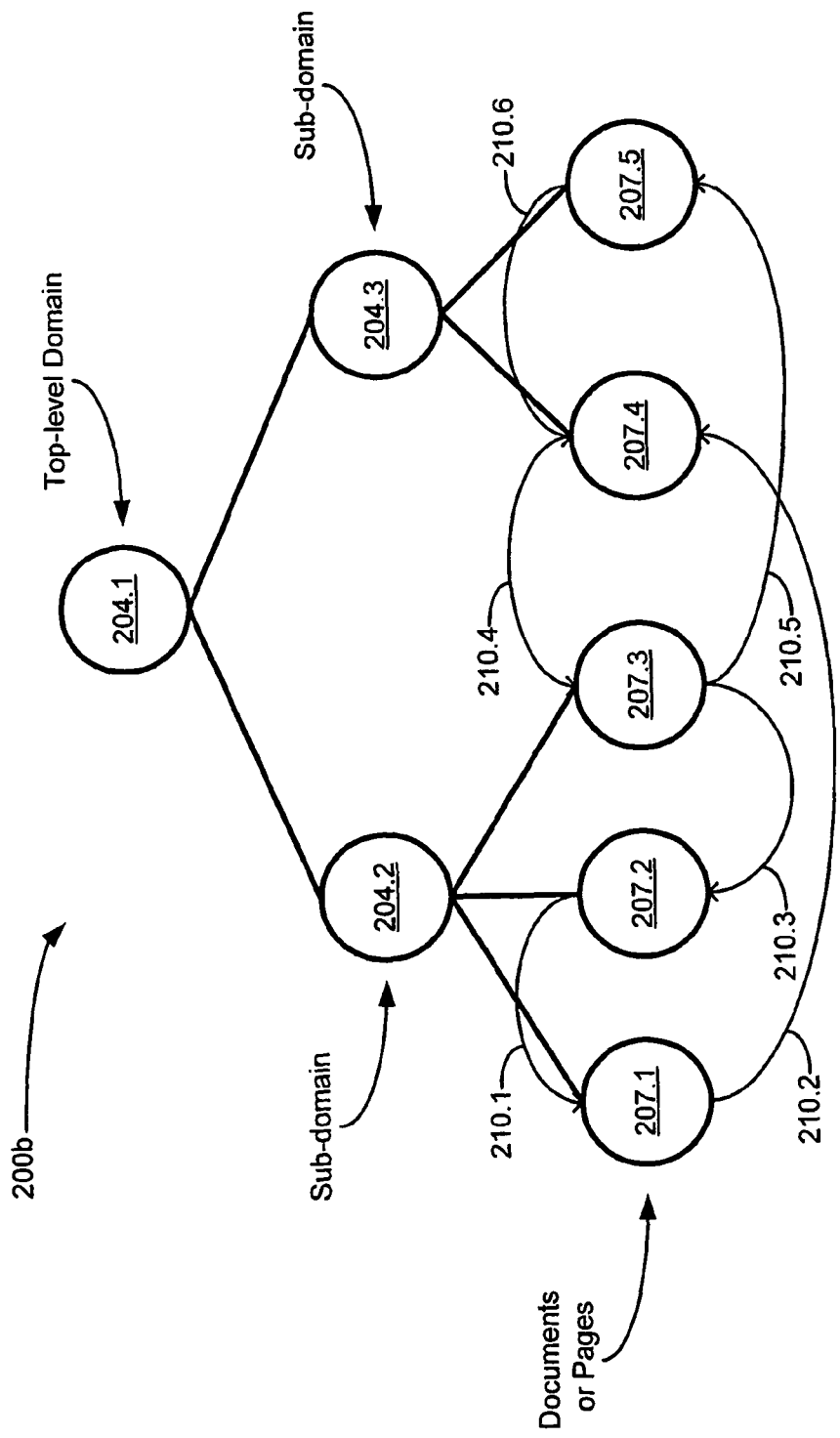

Next, a tree 200b (see FIG. 2b) including a plurality of nodes 204.1-204.3 and the plurality of nodes 207.1-207.5 representing a portion of an exemplary structure of the world wide web may be constructed. As shown in FIG. 2b, the tree 200b includes the node 204.1 corresponding to a domain located at the top-level of the hierarchy, and the nodes 204.2-204.3 corresponding to respective sub-domains located at the next level below the top-level of the hierarchy. The tree 200b further includes the leaf nodes 207.1-207.5 representing the respective documents or web pages associated with the respective sub-domains 204.2-204.3. Each of the nodes 204.2-204.3 corresponding to the respective sub-domains is directly connected to the node 204.1 corresponding to the top-level domain. Each of the nodes 204.2-204.3 may therefore be regarded as a "child" of the node 204.1, which may be regarded as the "parent" or "root" of the nodes 204.2-204.3. Similarly, each of the leaf nodes 207.1-207.3 is directly connected to the node 204.2, and each of the leaf nodes 207.4-207.5 is directly connected to the node 204.3. The leaf nodes 207.1-207.3 may therefore be regarded as "children" of the node 204.2, which may be regarded as the parent or root of the leaf nodes 207.1-207.3. In addition, the leaf nodes 207.4-207.5 may be regarded as children of the node 204.3, which may be regarded as the parent or root of the leaf nodes 207.4-207.5.

For example, the node 204.1 may represent the server 104.1, and the nodes 204.2-204.3 may represent the servers 104.2-104.3, respectively, within the environment 100 of FIG. 1. Further, the leaf nodes 207.1-207.3 may represent the web pages 107.1-107.3, respectively, and the leaf nodes 207.4-207.5 may represent the web pages 107.4-107.5, respectively, within the environment 100 of FIG. 1. Accordingly, within the exemplary hierarchical domain structure of FIG. 2b, the web pages 107.1-107.3 represented by the leaf nodes 207.1-207.3, respectively, may be maintained by the server 104.2 represented by the node 204.2, and the web pages 107.4-107.5 represented by the leaf nodes 207.4-207.5, respectively, may be maintained by the server 104.3 represented by the node 204.3.

It is noted that the physical or logical locations of each of the servers 104.1-104.3 (see FIG. 1) represented by the nodes 204.1-204.3 (see FIG. 2) and each of the web pages 107.1-107.5 (see FIG. 1) represented by the leaf nodes 207.1-207.5 (see FIG. 2) can be defined by a unique uniform resource locator (URL), which, in general, provides information regarding the communications protocol, the top level domain, and optionally one or more sub-domains at levels below the top level, associated with the respective server or web page. For each of the web pages 207.1-207.5, the URL also defines the path to the web page. For example, the physical or logical location of the server 204.1 may be defined by the exemplary URL $$\text{http://www.uni.edu,} \qquad (1)$$

in which "http" is the communications protocol, and "uni.edu" defines the top-level domain, associated with the server 204.1. In this example, the top-level domain associated with the server 204.1 corresponds to a university organization. Further, the physical or logical location of the server 204.2 may be defined by the exemplary URL $$\text{http://www.dept\_1.uni.edu} \qquad (2)$$

in which "http" is the communications protocol, and "dept_1.uni.edu" defines the sub-domain, associated with the server 204.2. In this example, the sub-domain associated with the server 204.2 corresponds to a department within the university organization. Similarly, the physical or logical location of the server 204.3 may be defined by the exemplary URL $$\text{http://www.dept\_2.uni.edu} \qquad (3)$$

in which "http" is the communications protocol, and "dept_2.uni.edu" defines the sub-domain, associated with the server 204.3. In this example, the sub-domain associated with the server 204.3 corresponds to another department within the university organization. In addition, the physical or logical location of each of the web pages 207.1-207.5 may be defined by a URL of the form $$\text{http://www.dept\_n.uni.edu/pubs\_m} \qquad (4)$$

in which "http" is the communications protocol, and "dept_n.uni.edu" defines the sub-domain (n=1 or 2), associated with the corresponding web page 207.1, 207.2, 207.3, 207.4, or 207.5. Further, "dept_n.uni.edu/pubs_m" (n=1 or 2; m=1, 2, 3, 4, or 5) defines the path (including the sub-directories, "pubs_m") to the corresponding web page 207.1, 207.2, 207.3, 207.4, or 207.5. For example, the physical or logical location of the web page 207.1 may be defined by a URL of the form http://www.dept_1.uni.edu/pubs1, and the physical or logical location of the web page 207.4 may be defined by a URL of the form http://www.dept_2.uni.edu/pubs_4. The tree of nodes 200b may therefore be regarded as a tree of URLs, in which each URL corresponds to a respective one of the nodes 204.1-204.3, 207.1-207.5 of the tree 200b.

The presently disclosed system and method of obtaining an importance ranking for a hierarchical collection of objects will be better understood with reference to the following illustrative example and FIGS. 3a-3d, which depict a plurality of nodes 304.1-304.3 representing respective objects to be ranked. Like the nodes 207.1-207.5 depicted in FIGS. 2a-2b, each of the nodes 304.1-304.3 of FIGS. 3a-3d may represent a respective web page including one or more hyperlinks ("links") for accessing selected ones of the other web pages.

Figure 3A:
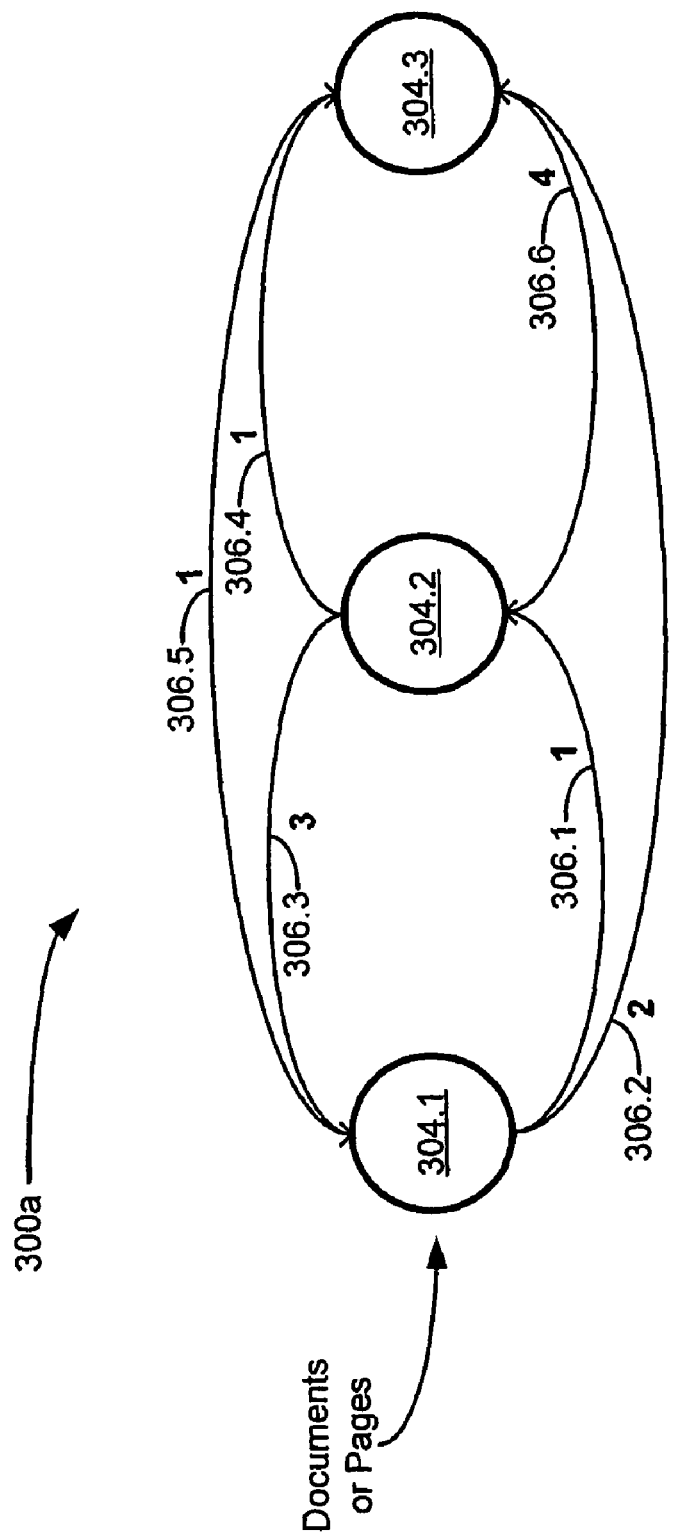
FIG. 3a is a directed graph including a plurality of nodes representing hyperlinked pages in the environment of FIG. 1, and FIGS. 3b-3d are diagrams of a tree including a plurality of leaf nodes corresponding to the pages of FIG. 3a, which may be employed to illustrate an exemplary use of the presently disclosed system and method of obtaining an importance ranking.

FIG. 3a depicts a directed graph 300a including the plurality of nodes (i.e., web pages) 304.1-304.3 and a plurality of links 306.1-306.6 interconnecting the respective pages 304.1-304.3. As shown in FIG. 3a, the links 306.1-306.6 correspond to directed edges interconnecting selected pairs of the web pages 304.1-304.3. Because each of the web pages 304.1-304.3 may contain one or more links to one or more of the other pages, each of the edges in the directed graph 300a is "weighted" by the number of links from one web page to another. For example, the edge 306.1 represents one link from the web page 304.1 to the web page 304.2, the edge 306.2 represents two links from the web page 304.1 to the web page 304.3, the edge 306.3 represents three links from the web page 304.2 to the web page 304.1, the edge 306.4 represents one link from the web page 304.2 to the web page 304.3, the edge 306.5 represents one link from the web page 304.3 to the web page 304.1, and the edge 306.6 represents four links from the web page 304.3 to the web page 304.2.

Figure 3B:
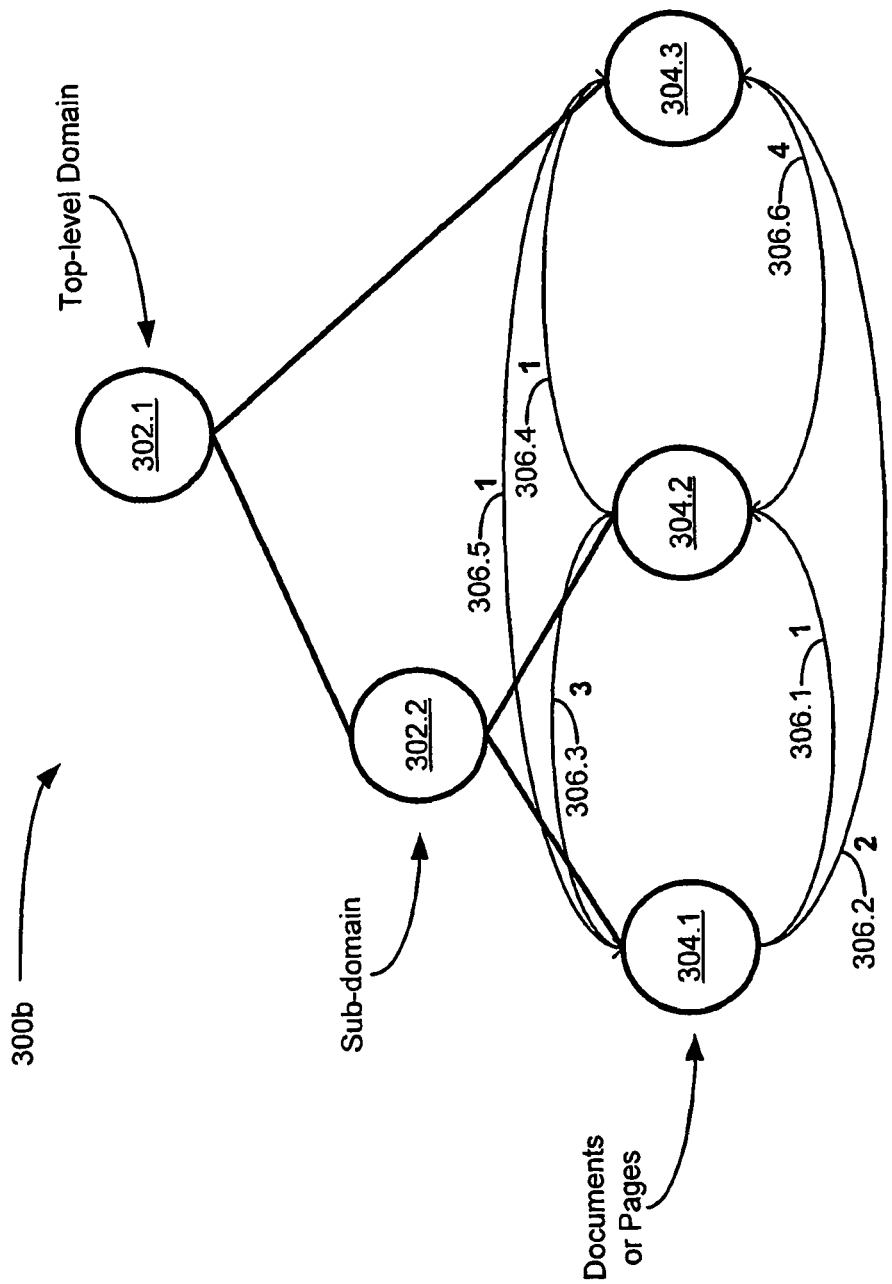
Figure 3C:
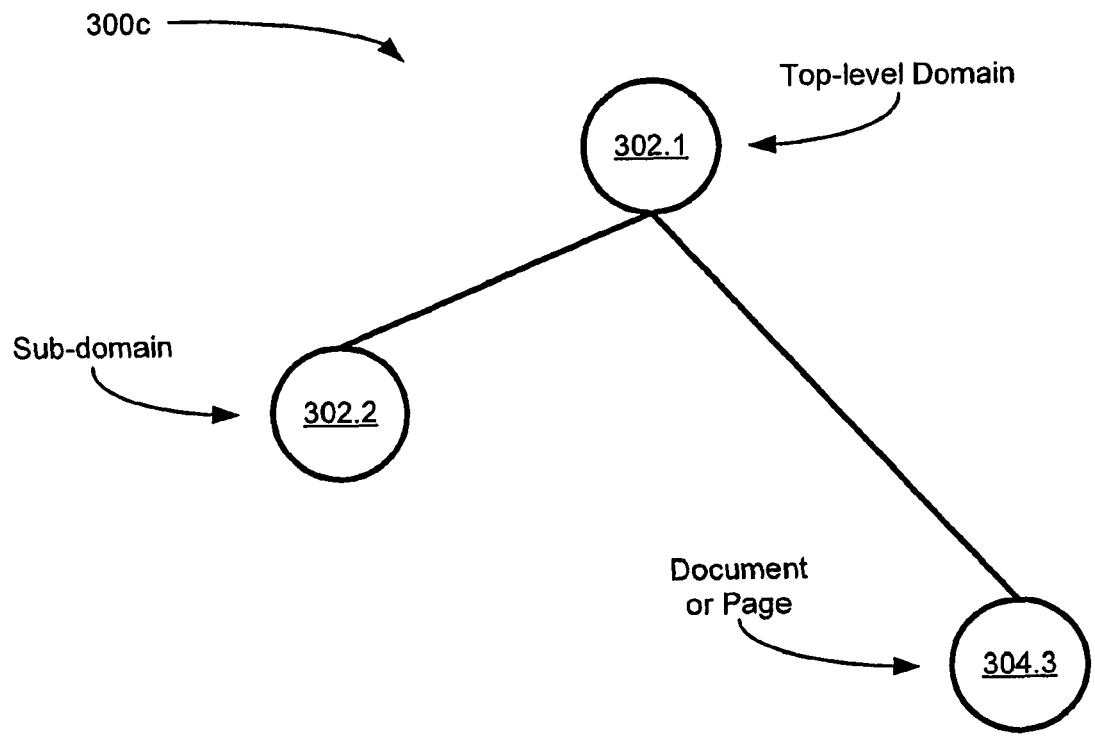
Figure 3D:
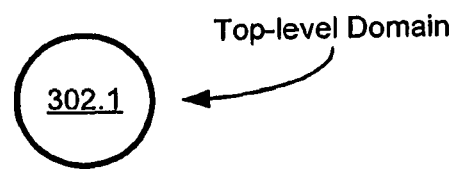

In this illustrative example, the web pages 304.1-304.3 represented by the nodes in the directed graph 300a are hierarchically classified based upon the domain and/or sub-domains associated with each of the pages. FIG. 3b depicts a tree 300b, in which a node 302.1 corresponds to a domain at the top-level of the hierarchy, and a node 302.2 corresponds to a sub-domain at the next level below the top-level of the hierarchy. Like the nodes 204.1-204.3 included in the tree 200 of FIG. 2, each of the nodes 302.1-302.2 included in the tree 300b may correspond to a respective server within the environment 100 of FIG. 1. As shown in FIG. 3b, the tree 300b includes the nodes 304.1-304.3 representing the respective web pages to be ranked. Specifically, each of the nodes 304.1-304.3 representing a respective page is a leaf node of the tree 300b. The tree 300b further includes the plurality of links 306.1-306.6 interconnecting the respective web pages 304.1-304.3. As described above, each of the links 306.1-306.6 is represented by a directed edge weighted by the number of links from one web page to another.

Each of the web pages 304.1-304.3 represented by the respective leaf nodes of the tree 300b has an associated ranking, which can be expressed as a discrete probability distribution, i.e., a vector of length N whose entries are non-negative and sum to 1, in which "N" is the number of objects. Each of the rankings associated with the respective pages 304.1-304.3 is initialized as the probability distribution [1]. In addition, each of the web pages 304.1-304.3 has an associated vector of "non-local" links, each element of which corresponds to the number of outlinks from that page to one of the other pages, and/or the number of inlinks from one of the other pages to that page. Each of the vectors of non-local links associated with the respective pages 304.1-304.3 is initialized based upon the weightings of the directed edges connected to the pages.

Specifically, the vector of non-local links associated with the web page 304.1 is initialized as $$\begin{bmatrix} 0 \\ 1 \\ 2 \end{bmatrix}, \quad (5)$$

in which "1" corresponds to the weighting of the edge representing the link 306.1, and "2" corresponds to the weighting of the edge representing the link 306.2. The element "0" in the vector of non-local links (5) reflects the fact that the disclosed technique of obtaining an importance ranking ignores links from (or to) the web page 304.1 to (or from) itself.

Further, the vector of non-local links associated with the web page 304.2 is initialized as $$\begin{bmatrix} 3 \\ 0 \\ 1 \end{bmatrix}, \quad (6)$$

in which "3" corresponds to the weighting of the edge representing the link 306.3, and "1" corresponds to the weighting of the edge representing the link 306.4. The element "0" in the vector of non-local links (6) reflects the fact that the disclosed technique of obtaining an importance ranking ignores links from (or to) the web page 304.2 to (or from) itself.

Moreover, the vector of non-local links associated with the web page 304.3 is initialized as $$\begin{bmatrix} 1 \\ 4 \\ 0 \end{bmatrix}, \quad (7)$$

in which "1" corresponds to the weighting of the edge representing the link 306.5, and "4" corresponds to the weighting of the edge representing the link 306.6. The element "0" in the vector of non-local links (7) reflects the fact that the disclosed technique of obtaining an importance ranking ignores links from (or to) the web page 304.3 to (or from) itself.

To obtain the importance ranking of the web pages 304.1-304.3, a first subtree of the tree 300b is selected having a depth equal to one. For example, a first subtree containing the node 302.2 and the leaf nodes 304.1-304.2 may be selected. It is noted that the node 302.2 may be regarded as the root node of this first subtree, and the leaf nodes 304.1-304.2 may be regarded as children of the root node 302.2. Next, for each leaf node 304.1-304.2 of this first subtree, the vector of non-local links associated with that leaf node is partitioned into a vector of "local" links relative to the subtree and a vector of non-local links relative to the subtree. In this example, the vector of local links associated with the respective leaf node includes all of the links from that leaf node to the other leaf node (i.e., the node 304.1 or 304.2) within the first subtree. Further, the vector of non-local links associated with the respective leaf node includes all of the links from that leaf node to the other leaf node (i.e., the node 304.3) outside of the first subtree.

Specifically, the vector of non-local links (5) associated with the web page 304.1 is partitioned into a vector of local links expressed as $$\begin{bmatrix} 0 \\ 1 \end{bmatrix}, \quad (8)$$

and a vector of non-local links expressed as $$[2]. \quad (9)$$

Further, the vector of non-local links (6) associated with the web page 304.2 is partitioned into a vector of local links expressed as $$\begin{bmatrix} 3 \\ 0 \end{bmatrix}, \quad (10)$$

and a vector of non-local links expressed as $$[1]. \quad (11)$$

Next, two matrices are constructed using the vectors of local links and the vectors of non-local links associated with the leaf nodes 304.1-304.2 of the first selected subtree. Specifically, a first matrix having m columns and m rows (in which "m" is the number of leaf nodes in the subtree) is constructed by concatenating the vectors of local links (8) and (10) above, i.e., $$\begin{bmatrix} 0 & 3 \\ 1 & 0 \end{bmatrix}. \quad (12)$$

Further, a second matrix having m columns and k rows (in which "k" is the number of leaf nodes outside of the subtree) is constructed by concatenating the vectors of non-local links (9) and (11) above, i.e., $$[2 \ 1]. \quad (13)$$

Next, a non-hierarchical base ranking technique (e.g., the PageRank™ technique or any other suitable ranking technique) is applied to the matrix of local links (12) above to obtain a probability distribution that represents a local ranking of the web pages represented by the leaf nodes 304.1-304.2 within the first subtree. For example, a base ranking technique may be applied to the matrix of local links (12) to obtain the following exemplary vector of local ranks of the web pages 304.1-304.2:

$$\begin{bmatrix} 0.7 \\ 0.3 \end{bmatrix}. \quad (14)$$

The vector of local ranks (14) corresponds to the local ranking of the web pages 304.1-304.2 within the first subtree.

The matrix of non-local links (13) is then multiplied by the local ranking (14) to generate a single vector of non-local links for the first subtree. For example, $$[2 \ 1] \cdot \begin{bmatrix} 0.7 \\ 0.3 \end{bmatrix} = [1.7]. \quad (15)$$

The single vector of non-local links may therefore be expressed as $$\begin{bmatrix} 0 \\ 1.7 \end{bmatrix}, \quad (16)$$

in which "1.7" corresponds to the non-local link data for the first subtree. The element "0" in the vector of non-local links (16) reflects the fact that the disclosed technique of obtaining an importance ranking ignores links from (or to) a web page to (or from) itself.

Next, the ranking associated with each of the web pages 304.1-304.2 is scaled by the corresponding element of the vector of local ranks (14), and these scaled rankings of the web pages 304.1-304.2 are concatenated into a single ranking for the first subtree. As described above, the rankings associated with the respective web pages 304.1-304.2 were initialized as the probability distribution [1]. Accordingly, the scaled rankings of the web pages 304.1-304.2 may be expressed as $$\begin{bmatrix} 1 & 0 \\ 0 & 1 \end{bmatrix} \begin{bmatrix} 0.7 \\ 0.3 \end{bmatrix} = \begin{bmatrix} 0.7 \\ 0.3 \end{bmatrix}, \quad (17)$$

in which "0.7" is the scaled ranking of the web page 304.1, and "0.3" is the scaled ranking of the web page 304.2. The leaf nodes 304.1-304.2 of the first subtree are then deleted from the tree 300b, thereby turning the root node 302.2 into a leaf node (see FIG. 3c).

Next, a second subtree of the tree 300b (see FIG. 3b) is selected having a depth equal to one. It is noted that, in this illustrative example, only one subtree of depth one remains after deleting the leaf nodes 304.1-304.2 from the tree 300b, i.e., the subtree 300c containing the root node 302.1 and the leaf nodes 302.2 and 304.3 (see FIG. 3c). As described above, the leaf node 302.2 corresponds to the root node of the first subtree, and the leaf node 304.3 represents one of the web pages 304.1-304.3 to be ranked. For each of the leaf nodes 302.2 and 304.3 of this second subtree 300c, the vector of non-local links associated with that leaf node is partitioned into a vector of local links and a vector of non-local links relative to the second subtree. It is noted that because the second subtree 300c is the sole remaining subtree of the tree 300b after the leaf nodes 304.1-304.2 are deleted, the vector of non-local links relative to the second subtree associated with each of the leaf nodes 302.2 and 304.3 is empty.

Accordingly, in this illustrative example, the vector of local links associated with the leaf node 302.2 may be expressed as $$\begin{bmatrix} 0 \\ 1.7 \end{bmatrix}. \quad (18)$$

Further, the vector of local links associated with the web page 304.3 within the second subtree may be expressed as $$\begin{bmatrix} 1 \\ 4 \end{bmatrix}. \quad (19)$$

Because the nodes 304.1-304.2 have been deleted from the tree 300b, the elements of the vector of local links (19) associated with the web page 304.3 are combined, i.e., $$\begin{bmatrix} 5 \\ 0 \end{bmatrix}, \quad (20)$$

in which "5" is the sum of the elements "1" and "4" of the vector of local links (19). The element "0" in the vector of local links (20) reflects the fact that the disclosed technique of obtaining an importance ranking ignores links from (or to) a web page to (or from) itself.

Next, a matrix is constructed using the vectors of local links (18) and (20) associated with the leaf nodes 302.2 and 304.3, respectively, of the second subtree. Specifically, a matrix is constructed by concatenating the vectors of local links (18) and (20) above, i.e., $$\begin{bmatrix} 0 & 5 \\ 1.7 & 0 \end{bmatrix}. \quad (21)$$

Next, the non-hierarchical base ranking technique (e.g., the PageRank™ technique) is applied to the matrix of local links (21) above to obtain a probability distribution that represents a local ranking of the leaf nodes 302.2 and 304.3 within the second subtree. For example, a base ranking technique may be applied to the matrix of local links (21) to obtain the following exemplary vector of local ranks associated with the leaf nodes 302.2 and 304.3:

$$\begin{bmatrix} 0.6 \\ 0.4 \end{bmatrix}. \quad (22)$$

The vector of local ranks (22) corresponds to the local ranking of the leaf nodes 302.2 and 304.3 within the second subtree.

Next, the ranking associated with each of the web pages 304.1-304.3 is scaled by a corresponding element of the vector of local ranks (22). Specifically, the rankings of the web pages 304.1-304.2 (see, e.g., the rankings (17) above) are scaled by the element of the vector of local ranks (22) corresponding to the local ranking of the leaf node 302.2, i.e., "0.6". Further, the ranking of the web page 304.3 is scaled by the element of the vector of local ranks (22) corresponding to the local ranking of the leaf node 304.3, i.e., "0.4". As described above, the ranking associated with the web page 304.3 was initialized as the probability distribution [1].

Accordingly, the scaled rankings of the web pages 304.1-304.3 may be expressed as $$\begin{bmatrix} 0.7 & 0 \\ 0.3 & 0 \\ 0 & 1 \end{bmatrix} \begin{bmatrix} 0.6 \\ 0.4 \end{bmatrix} = \begin{bmatrix} 0.42 \\ 0.18 \\ 0.40 \end{bmatrix}, \quad (23)$$

in which "0.42" is the scaled ranking of the web page 304.1, "0.18" is the scaled ranking of the web page 304.2, and "0.40" is the scaled ranking of the web page 304.3. The leaf nodes 302.2 and 304.3 of the second subtree are then deleted, thereby collapsing the second subtree to the single node 302.1 (see FIG. 3d). The ranking (23) therefore corresponds to the final importance ranking of the web pages 304.1-304.3 expressed as a probability distribution.

Figure 4A:
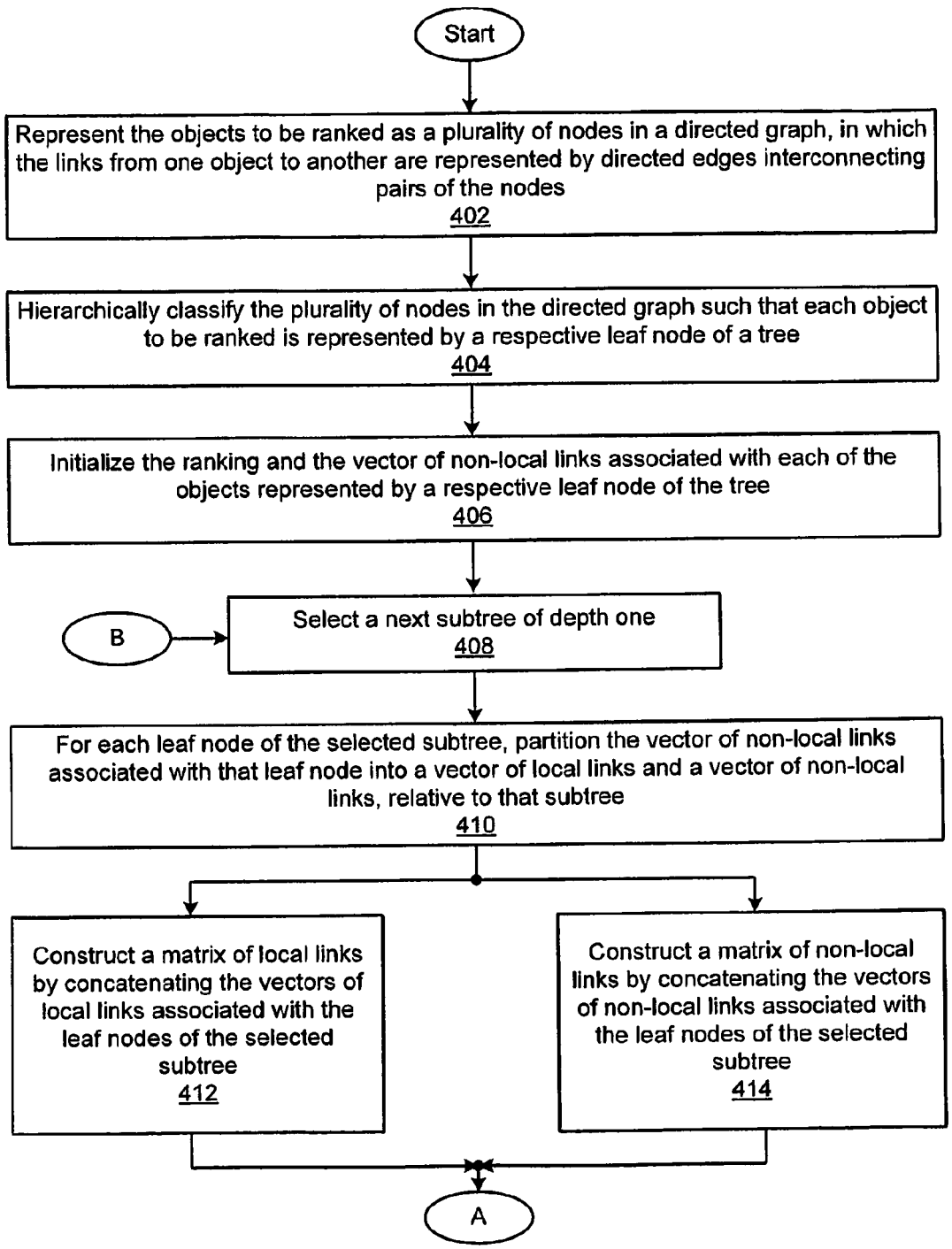
FIGS. 4a-4b depict a flow diagram illustrating a method of operating the presently disclosed system for obtaining an importance ranking of objects in a linked database having a hierarchical structure.
Figure 4B:
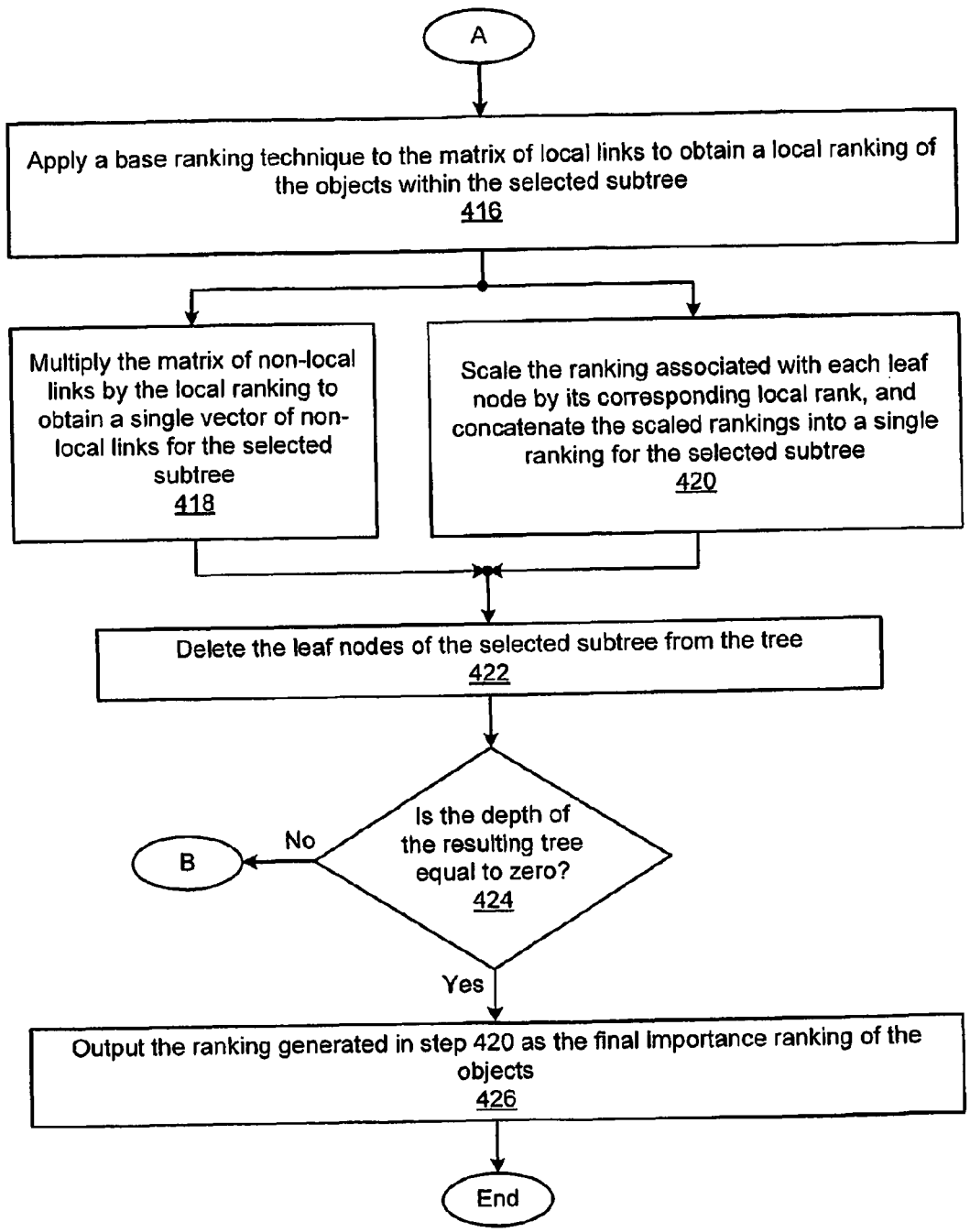

An illustrative method of operating the presently disclosed system for obtaining an importance ranking for a hierarchical collection of objects in a linked database is described below with reference to FIGS. 4a-4b. As depicted in step 402 (see FIG. 4a), the objects to be ranked are represented as a plurality of nodes in a directed graph, in which the links from one object to another are represented by directed edges interconnecting pairs of the plurality of nodes. Each of the edges included in the directed graph is weighted by the number of links from one object to another. Next, the plurality of nodes in the directed graph is hierarchically classified such that each object to be ranked is represented by a respective leaf node of a tree, as depicted in step 404. Associated with each leaf node in the tree are two data structures, i.e., a ranking and a vector of non-local links. The ranking and the vector of non-local links associated with each of the objects to be ranked (which are represented by a respective leaf node in the tree) are initialized, as depicted in step 406. Specifically, the ranking associated with each object is initialized to the probability distribution [1], and the vector of non-local links associated with each object is initialized based upon the weightings of the respective directed edges associated with that object. Next, a subtree of depth one is selected, as depicted in step 408. In at least the first selected subtree, each leaf node represents a respective object to be ranked. For each leaf node in the selected subtree, the associated vector of non-local links is partitioned into a vector of local links, and a vector of non-local links, relative to that subtree, as depicted in step 410. Next, a first matrix is constructed by concatenating the vectors of local links associated with the leaf nodes of the selected subtree, as depicted in step 412. In addition, a second matrix is constructed by concatenating the vectors of non-local links associated with the leaf nodes of the selected subtree, as depicted in step 414. A base ranking technique such as the PageRank™ technique is then applied to the matrix of local links to obtain a local ranking of the objects within the selected subtree, as depicted in step 416 (see FIG. 4b). This local ranking is expressed as a probability distribution. Next, the matrix of non-local links is multiplied by the local ranking to obtain a single vector of non-local links for the selected subtree, as depicted in step 418. In addition, the ranking associated with each leaf node of the selected subtree is scaled by its corresponding local rank, and the scaled rankings are concatenated into a single ranking expressed as a probability distribution, as depicted in step 420. The leaf nodes of the selected subtree are then deleted from the tree, as depicted in step 422. Next, a determination is made as to whether the depth of the resulting tree is equal to zero, as depicted in step 424. In the event the depth of the resulting tree is not equal to zero, the process loops back to step 408, in which a next subtree is selected. Otherwise, the single ranking generated in step 420 is output as the importance ranking of the objects, as depicted in step 426. For example, an indication of the importance ranking of the objects may be outputted to a computer display or printer, and/or stored in memory.

Having described the above illustrative embodiments, other alternative embodiments or variations may be made. For example, it was described that the environment 100 (see FIG. 1) represents an exemplary environment for a database of web pages that may be hyperlinked to one another. It is noted that a hierarchical structure may be imposed upon the web not only by the URL hierarchy, but also by a topic or subject matter hierarchy, or any other suitable hierarchy. In alternative embodiments, the presently disclosed system and method of obtaining an importance ranking may be employed in any suitable environment for a hierarchical collection of objects in a linked database, including, but not limited to, a database of documents with citations to identify important authors and/or papers, and a corporate e-mail database, in which a hierarchical structure can be imposed, e.g., by the corporate hierarchy.

In addition, it was described that a directed graph may be constructed that includes nodes representing the objects in the linked database. Such a directed graph may be constructed in terms of the objects' outlinks, which provide indications of the strength of the connections from a particular node to the other nodes in the graph. Alternatively, the directed graph may be constructed in terms of the objects' inlinks, which provide indications of the strength of the connections to a particular node from the other nodes in the graph. For example, the indegree of a URL may be regarded as a measure of the "respect" afforded to a web page corresponding to that URL, and the outdegree of a URL may be regarded as a measure of the "influence" of a web page corresponding to that URL. The presently disclosed system and method of importance ranking may therefore be configured to operate on outlinks to rank objects according to the respect afforded to them by outside sources, to operate on inlinks to rank objects according to their influence upon others, or to operate on any suitable combination of inlinks and outlinks to rank objects according to their respect and/or influence.

It is noted that the presently disclosed system and method of obtaining an importance ranking can be applied to all of the pages on the world wide web, to the pages associated with a specified domain (e.g., .edu) of the web, or to the result set of a query search. For example, it was described that, in response to a user's query, the search engine 106 (see FIG. 1) operates to search a "snapshot" (i.e., a cached version) of the web or some subset thereof to identify web pages containing keywords specified in the query, and generates a result set including a list of the identified pages, which may then be provided to the host 102.1 executing the web browser 105 in order of their importance, or some combination of their relevance and their importance. In an alternative embodiment, the search engine 106 may generate a tree including a plurality of leaf nodes representing the identified web pages, and may provide a representation of that tree (e.g., a tree of URLs) to the host 102.1. The presently disclosed importance ranking technique, implemented either as part of the web browser 105 or as part of a separate application program executing on the host 102.1, may then be employed to obtain the importance ranking of the identified pages using the tree of URLs.

It is further noted that in the presently disclosed system for obtaining an importance ranking, a tree may be employed to represent a probabilistic hierarchy, in which there is some probability that each object to be ranked is associated with some path in the tree. For example, in such a probabilistic hierarchy, each object may appear more than once in the tree. As a result, the final importance ranking of the objects may be some combination of the ranks they obtain in each of their localities.

In addition, with reference to the above illustrative embodiment, it was described that each web page to be ranked has an associated vector of non-local links, each element of which corresponds to the number of outlinks from that page to one of the other pages to be ranked, and/or the number of inlinks from one of the other pages to be ranked to that page. For example, the elements of the vectors of non-local links may be obtained from the weightings of the edges in a directed graph. In alternative embodiments, binary descriptors, or any other suitable descriptors, may be employed to indicate the weightings of the directed edges. For example, the binary descriptor "1" may be employed in conjunction with a directed edge (i.e., a link) to indicate any specified non-zero weight of that link; otherwise, the binary descriptor "0" may be employed. It was also described that after deleting a number of leaf nodes from a tree, certain elements of a vector of local links associated with a remaining node of the tree may be combined, as necessary, by summing the elements. In an alternative embodiment, if binary descriptors are employed to indicate the weightings of the directed edges, then suitable logical operations (e.g., AND, OR, XOR) may be used, as necessary, to combine certain elements of a vector of local links associated with a remaining node of the tree.

In addition, although the presently disclosed importance ranking technique is described herein in the context of obtaining an importance ranking for a hierarchical collection of objects in a linked database, it should be understood that the disclosed technique applies to any referential, hierarchical database, i.e., the references between documents or pages need not be hyperlinks per se. For example, references to other documents or pages may be inferred based upon a textual analysis of the document or page, i.e., the strength or weight of a reference may be based upon the content of the document or page. Further, if the references were hyperlinks, then the strength or weight of a reference may be a function of where the links occur within the document or page, and/or the content of the surrounding text, etc. The presently disclosed system and method for obtaining an importance ranking may therefore be employed to rank objects such as documents or pages in any suitable linked or referential database.

It will be appreciated by those of ordinary skill in the art that further modifications to and variations of the above-described system and method of obtaining an importance ranking for a hierarchical collection of objects may be made without departing from the inventive concepts disclosed herein. Accordingly, the invention should not be viewed as limited except as by the scope and spirit of the appended claims.

What is claimed is:

1. A method executed by a processor to obtain an importance ranking for a plurality of objects in a referential database, comprising the steps of:

representing said plurality of objects as a plurality of leaf nodes of a tree, wherein each of the plurality of leaf nodes of said tree has an associated initial ranking and an associated initial set of non-local references to at least another one of the plurality of leaf nodes of said tree;

partitioning said tree into at least one subtree having a root node and a plurality of leaf nodes directly connected to the root node, said at least one subtree including at least one subtree having at least one leaf node corresponding to at least one of the plurality of leaf nodes of said tree;

in a first generating step, for each leaf node included in said at least one subtree, generating a set of local references to at least one leaf node within said subtree, and generating a set of non-local references to at least one leaf node of said tree outside of said subtree;

in a second generating step, generating a local ranking for the plurality of leaf nodes within said subtree based upon the sets of local references generated in the first generating step;

in a third generating step, generating a set of non-local references to at least one leaf node of said tree outside of said subtree based upon the sets of non-local references generated in the first generating step;

scaling said rankings associated with said plurality of leaf nodes included in said subtree by the local ranking generated in the second generating step to obtain a scaled ranking for the plurality of leaf nodes within said subtree;

deleting said plurality of leaf nodes included in said subtree from said tree;

in the event said tree has at least one remaining leaf node, repeating said partitioning step, said first, second, and third generating steps, said scaling step, and said deleting step;

otherwise, outputting the scaled ranking as the importance ranking for said plurality of objects.

2. The method of claim 1 further including the step of expressing each of said initial ranking, said local ranking, said scaled ranking, and said importance ranking as a probability distribution.

3. The method of claim 2 wherein said initial ranking associated with each of the plurality of leaf nodes of said tree is the probability distribution [1].

4. The method of claim 1 wherein said second generating step includes expressing each of the sets of local references generated in the first generating step as a vector, constructing a matrix of local references by concatenating the vectors of local references, and applying a base ranking technique to the matrix of local references to obtain said local ranking.

5. The method of claim 4 wherein said base ranking technique is a non-hierarchical ranking technique.

6. The method of claim 4 wherein said third generating step includes expressing each of the sets of non-local references generated in the first generating step as a vector, constructing a matrix of non-local references by concatenating the vectors of non-local references, and multiplying the matrix of non-local references by said local ranking to generate the set of non-local references to at least one leaf node of said tree outside of said subtree.

7. The method of claim 1 wherein said outputting step includes outputting said importance ranking for said plurality of objects to a computer display.

8. A system for obtaining an importance ranking for a plurality of objects in a referential database, comprising:

at least one processor operative to execute at least one program out of at least one memory for processing data corresponding to said plurality of objects in said referential database; and at least one computer display, said program being operative:

to represent said plurality of objects as a plurality of leaf nodes of a tree, wherein each of the plurality of leaf nodes of said tree has an associated initial ranking and an associated initial set of non-local references to at least another one of the plurality of leaf nodes of said tree;

to partition said tree into at least one subtree having a root node and a plurality of leaf nodes directly connected to the root node, said at least one subtree including at least one subtree having at least one leaf node corresponding to at least one of the plurality of leaf nodes of said tree;

for each leaf node included in said at least one subtree, to generate a set of local references to at least one leaf node within said subtree, and to generate a set of non-local references to at least one leaf node of said tree outside of said subtree;

to generate a local ranking for the plurality of leaf nodes within said subtree based upon the sets of local references;

to generate a set of non-local references to at least one leaf node of said tree outside of said subtree based upon the sets of non-local references;

to scale said rankings associated with said plurality of leaf nodes included in said subtree by the local ranking to obtain a scaled ranking for the plurality of leaf nodes within said subtree;

to delete said plurality of leaf nodes included in said subtree from said tree;

in the event said tree has at least one remaining leaf node, to repeat said partitioning of said tree into at least one subtree, said generation of the set of local references and the set of non-local references for each leaf node of said subtree, said generation of said local ranking for the plurality of leaf nodes within said subtree, said generation of said set of non-local references based upon the sets of non-local references for each leaf node of said subtree, said scaling of said rankings associated with the plurality of leaf nodes within said subtree, and said deletion of the plurality of leaf nodes included in said subtree from said tree; and otherwise, to output the scaled ranking to the computer display as the importance ranking for said plurality of objects.

9. The system of claim 8 wherein said program is operative to express each of said initial ranking, said local ranking, said scaled ranking, and said importance ranking as a probability distribution.

10. The system of claim 9 wherein said program is operative to express said initial ranking associated with each of the plurality of leaf nodes of said tree as the probability distribution [1].

11. The system of claim 8 wherein said program is operative to express each of the sets of local references as a vector, to construct a matrix of local references by concatenating the vectors of local references, and to apply a base ranking technique to the matrix of local references to obtain said local ranking.

12. The system of claim 11 wherein said base ranking technique is a non-hierarchical ranking technique.

13. The system of claim 11 wherein said program is operative to express each of the sets of non-local references as a vector, to construct a matrix of non-local references by concatenating the vectors of non-local references, and to multiply the matrix of non-local references by said local ranking to generate the set of non-local references to at least one leaf node of said tree outside of said subtree.

14. The system of claim 8 further including at least one host computer, at least one server computer, and at least one network, said at least one host computer and said at least one server computer being connected to said network, and wherein said at least one processor is included in said server computer.

15. The system of claim 14 wherein said computer display is included in said host computer.

16. The system of claim 8 further including at least one host computer, at least one server computer, and at least one network, said at least one host computer and said at least one server computer being connected to said network, and wherein said at least one processor is included in said host computer.

17. The system of claim 8 wherein said referential database comprises a linked database.

18. The system of claim 17 wherein said linked database comprises the world wide web.

19. The system of claim 8 wherein said referential database comprises a database of documents with citations.

20. The system of claim 8 wherein said referential database comprises an e-mail database.

* * * * *

UNITED STATES PATENT AND TRADEMARK OFFICE
CERTIFICATE OF CORRECTION

PATENT NO.        : 7,809,736 B2
APPLICATION NO.   : 11/919262
DATED             : October 5, 2010
INVENTOR(S)       : Amy Greenwald et al.

It is certified that error appears in the above-identified patent and that said Letters Patent is hereby corrected as shown below:

Column 1, line 37, "Explore™" should read --Explorer™--; and

Column 8, line 56, "pubs 1," should read --pubs_1,--.

Signed and Sealed this
Twentieth Day of December, 2011

David J. Kappos
*Director of the United States Patent and Trademark Office*